United States Patent [19]

Zimmermann

[11] Patent Number: 4,726,478
[45] Date of Patent: Feb. 23, 1988

[54] INSULATING JUG WITH SEALED LID

[75] Inventor: Anso Zimmermann, Niederaula, Fed. Rep. of Germany

[73] Assignee: Rotpunkt Dr. Anso Zimmermann, Niederaula, Fed. Rep. of Germany

[21] Appl. No.: 839,155

[22] Filed: Mar. 13, 1986

[30] Foreign Application Priority Data

Apr. 17, 1985 [DE] Fed. Rep. of Germany ....... 3513865

[51] Int. Cl.$^4$ ............................................. A47J 41/00
[52] U.S. Cl. .................................. 215/12.1; 215/13.1; 215/307; 215/352; 220/304; 222/572
[58] Field of Search ............... 215/13 A, 12 A, 13 R, 215/307, 352; 220/304, 420; 277/206 R; 222/519, 572

[56] References Cited

U.S. PATENT DOCUMENTS

| 1,353,909 | 9/1920 | Ingram et al. | 215/352 X |
| 2,582,566 | 1/1952 | Schwimmer et al. | 222/519 X |
| 2,600,714 | 6/1952 | Wenscott et al. | 220/304 X |
| 2,925,187 | 2/1960 | Bramming | 215/13 R |
| 3,127,049 | 3/1964 | Welty et al. | 220/304 X |
| 3,140,799 | 7/1964 | Mehr | 222/519 X |
| 3,532,244 | 10/1970 | Yates, Jr. | 215/352 X |
| 3,768,819 | 10/1973 | Bürkert | 277/206 R |
| 4,121,730 | 10/1978 | Dammer | 215/307 X |
| 4,133,462 | —1/1979 | Lindström | 215/307 X |
| 4,616,759 | 10/1986 | Mahler | 215/352 X |

FOREIGN PATENT DOCUMENTS

| 344562 | 11/1921 | Fed. Rep. of Germany | 215/352 |
| 1273766 | 7/1968 | Fed. Rep. of Germany | 215/13 R |
| 2152725 | 4/1973 | Fed. Rep. of Germany | |
| 497864 | 9/1954 | Italy | 215/341 |
| 8401096 | 11/1985 | Netherlands | 215/13 R |
| 3299 | of 1898 | United Kingdom | 215/352 |
| 499497 | 1/1939 | United Kingdom | 215/352 |
| 1339005 | 11/1973 | United Kingdom | 222/519 |

Primary Examiner—William Price
Assistant Examiner—Sue A. Weaver
Attorney, Agent, or Firm—Scully, Scott, Murphy & Presser

[57] ABSTRACT

The invention relates to an insulating jug having a casing in which a recess to receive a lid is arranged at the top and a filling opening is provided at the bottom of the recess that is closable by a closure member of the lid, with a spout projecting laterally from the recess and a sealing ring arranged between facing peripheral surfaces of the recess. The object of the invention is to form the insulating jug in such a way that continous sealing of the lid in the recess is ensured, with ease of operation. This is achieved by forming the sealing ring from a lip seal having a sealing lip directed inwardly of the jug and in that the peripheral surface cooperating with the sealing lip is cylindrical in the operating region of the sealing lip.

9 Claims, 4 Drawing Figures

INSULATING JUG WITH SEALED LID

TECHNICAL FIELD OF THE INVENTION

The invention relates to an insulating jug with a casing having a recess arranged therein for the receipt of a sealed lid.

BRIEF DESCRIPTION OF THE PRIOR ART

An insulating jug of this construction is described and illustrated in DE-OS No. 21 52 725.

In the known construction the lid is formed as a screw lid and the spout is a so-called closed spout, i.e. it is in the form of a nozzle surrounding a pouring passage.

A problem with insulating jugs is that liquid backs up behind the pouring opening in the pouring position can run out between the lid and the upper rim of the recess and thus soil the insulating jug itself and its surroundings.

The problem just described arises particularly in the case of insulating jugs with closed spouts, since closed spouts as a rule have smaller diameter pouring openings than do open spouts, so that the liquid can back up to a greater extent behind the pouring opening. The problem however also arises with insulating jugs with open spouts, in particular when, by reason of the construction used, the liquid is able to back up behind the pouring opening when the insulating jug is in the pouring position. The danger that the liquid may run out over the rim of the recess even without a liquid back-up behind the pouring opening even in the case of an insulating jug with an open spout arises in particular in pouring out residues, when the jug is tilted at an angle of more than 90°. The above-mentioned problem does not depend on whether the lid is a screw lid or a so-called stopper lid, since it occurs whenever there is a gap between the periphery of the lid and the periphery of the recess.

In the case of the known form attempts have been made to solve the problem by means of a sealing ring of round cross section, inserted between the periphery of the lid and the periphery of the recess in a groove formed in the lid, the breadth of which is several times the breadth of the sealing ring. Because of this increased breadth the lid can be raised from its closed position into its pouring position by unscrewing, the sealing ring, in the pouring position, being pressed by the shoulder of the groove against a sealing shoulder projecting from the periphery of the recess so that sealing is insured. The dimensions of the sealing shoulder are such that by further unscrewing of the lid the pressure point that can be felt at the sealing shoulder is passed and the lid can be completely screwed off.

The known form is disadvantageous for several reasons. First, there is the danger that the sealing ring becomes damaged at the sealing shoulder after repeated complete screwing off of the lid because of repeated squeezing, so that the seal is no longer guaranteed. Second, the sealing is in any case only guaranteed when the sealing ring is pressed against the sealing shoulder. This means that the lid is not sealed in an intermediate position in which pouring can also take place. Thus in such a case liquid can run out over the rim of the recess. A further disadvantage can be seen in the fact that it cannot be excluded that the sealing ring may squeeze past the sealing shoulder before the lid reaches its pouring position. In such case liquid could also run out over the rim of the recess. Furthermore in the known form the handling of the lid is impaired, since the compression or squeezing of the sealing ring hinders the displacement of the lid to a clearly detectable extent. Such resistance can be accepted in the closed position of the lid but not in an open position.

OBJECT OF THE INVENTION

The problem underlying the invention is to form an insulating jug of the construction indicated in the introduction so as to guarantee continuous sealing of the lid in the recess together with ease of handling it.

SUMMARY OF THE INVENTION

In the form according to the invention a lip seal is provided which guarantees the sealing both of a lid that has its own displaceable closure member and is therefore not displaced on opening and closing and of one that is displaced in the recess for opening and closing, e.g. by screwing. The provision of a lip seal is advantageous since with it there is relatively little resistance to deformation, so that on insertion or removal, in particular on opening and closing, of the lid, the additional force required is hardly noticeable. When the insulating jug is in the pouring position and the liquid level rises above the lip seal a pressure is exerted on the lip seal from the liquid column that increases the pressure of the sealing lip against the sealing surface and thus brings about improved sealing as the pressure increases. This is insured by the form according to the invention, since the sealing lip is displaced inwardly of the jug so that the liquid pressure that arises can act in the manner described above.

In a specific embodiment pursuant to the invention, both longitudinal displacement of the lip seal and unrolling thereof are prevented because the lip seal is held in the groove so that it cannot be displaced along the axis of the lid.

The form according to the invention can be realised both by arranging the lip seal in the peripheral surface of the lid and by arranging it in the peripheral surface of the recess. The above-mentioned advantages are obtained in both cases. A particular reason why the arrangement of the lip seal on the lid is advantageous is that such a seal can be used both in insulating jugs with closed spouts and in those with open spouts.

With this form however an insertion bevel is needed at the upper rim of the recess so that the sealing lip can be applied to the sealing surface on insertion of the lid without danger of damage. Such an insertion bevel is not necessary when the lip seal is arranged in the peripheral surface of the recess.

The contribution of the features of the sealing lip resides in that the lip seal does not have to ride over a screw thread as the lid is screwed in. In all positions of the lid it lies between the closed and pouring positions on a cylindrical sealing surface, and on further unscrewing of the lid the lip seal is immediately free of the cylindrical sealing surface.

When there is a closed spout it is necessary, in order to avoid the disadvantages mentioned above, to arrange the lip seal above the pouring passage. For this reason it is advantageous in the case of open spouts to arrange the lip seal as close as possible to the upper rim of the recess.

The progressive sealing action described above is augmented in the case of a construction in which the sealing lip projects from the side of the lip seal which faces radially inwardly towards the surface of the jug.

Care must be taken in the form according to the invention that the inner or outer peripheral rim directed away from the sealing lip is also sealed. Possible ways of doing this are for example to press the lip seal tightly into the groove and/or adhesion. In one embodiment the lip seal has two sealing lips and has a U-, V- or Y-shaped cross-section, through which both the radial inner and the radial outer sealing is ensured without additional steps. A further advantageous embodiment also leads to a simple and economical construction, since the lid and/or the casing can be made of plastic and hence a lip seal can be simply and cheaply moulded on by injection moulding.

BRIEF DESCRIPTION OF THE DRAWINGS

Exemplary embodiments of the invention will now be described in more detail with reference to a simplified drawing, in which.

DETAILED DESCRIPTION OF THE PREFERRED EMBODIMENTS OF THE INVENTION

Figure 1:
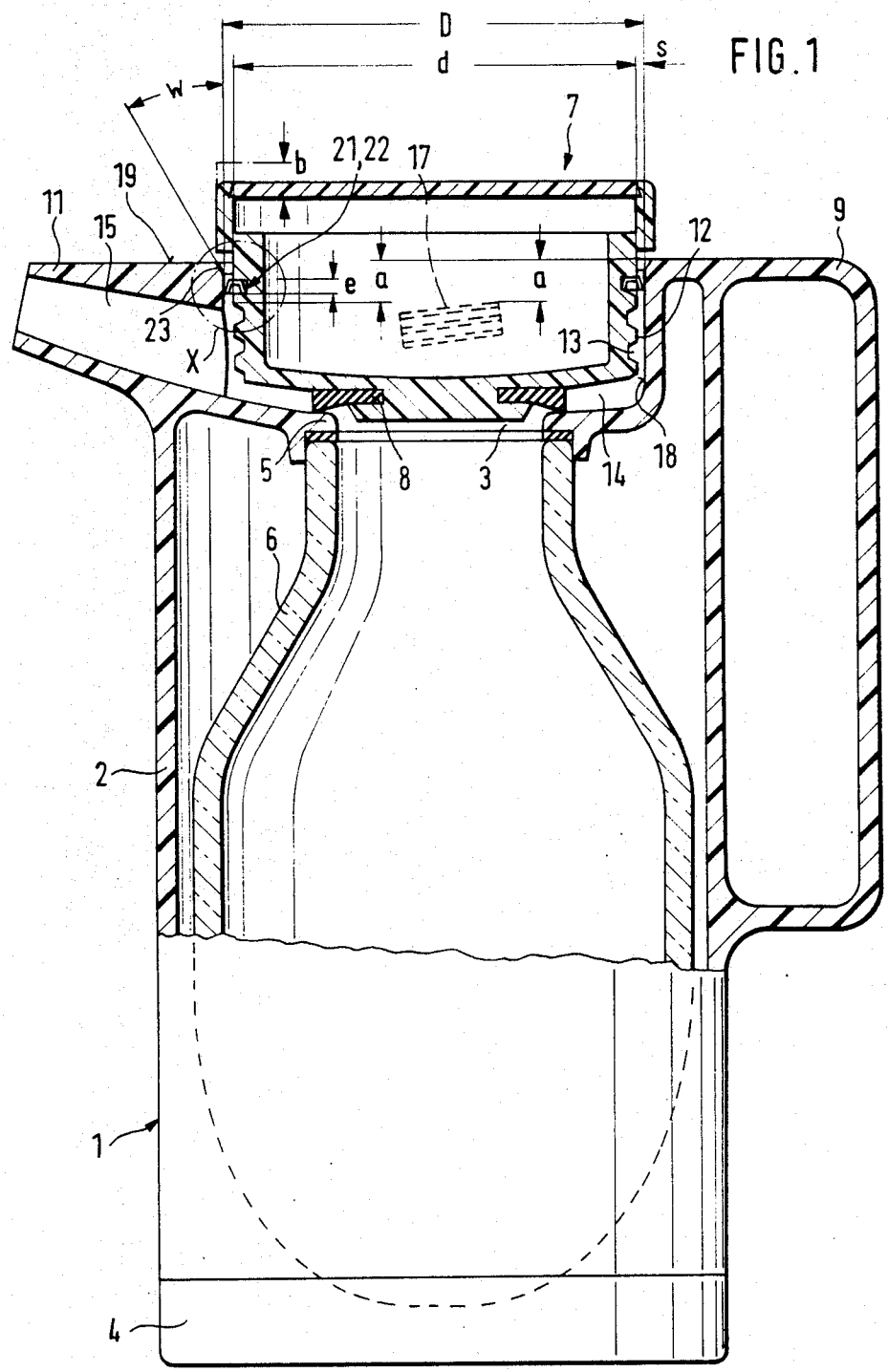
FIG. 1 shows as first embodiment an insulating jug formed according to the invention in vertical section.

The important parts of the insulating jug indicated generally in FIG. 1 by 1 are a protective casing 2 of plastic having a filling opening 3 at the top, an insulating insert 6 below the filling opening 3 pressed against an inner shoulder 5 by the bottom part 4 and having a coaxial opening of the same cross-section as the filling opening 3 in the protective casing 2, and a closure lid indicated generally by 7 on whose underside there is held in known manner a sealing ring 8 that lies in a sealing manner on the inner shoulder 5 in the closed position (as shown) of the closure lid 7.

A handle 9 and a closed spout 11 are formed integrally on the protective housing 2. The closure lid 7 has an outer screw thread 13 on its peripheral surface 12 and is screwed into a recess 14, arranged above the filling opening 3, from which a pouring passage 15 leads laterally and on the side opposite the handle 9 radially and obliquely upwards within the closed spout 11. Instead of an inner screw thread the recess 14 has inner screw segments 17 (shown by way of indication) which project radially from its peripheral surface 18 and are arranged diametrically opposite to one another or distributed around the peripheral surface 18 in the form of a star.

The topmost segment 17 is at a distance indicated by a from the top 19 of the protective casing 2. The arrangement is such that in the closed position of the closure lid 7 as shown the topmost thread of the external thread 13 is also at the distance a from the top 19. The distance a is at least as great as the distance b between the closed position of the closure lid 7 as shown and its pouring position wherein the sealing ring 8 is likewise raised by the amount b from the sealing surface on the inner shoulder 5. Above the external thread 13, and thus in the thread-free region a, a groove 21 is formed in the peripheral surface 12 to receive a lip seal 22. The lip seal 22 is one with two sealing lips and with a U-, V- or trapezoidal section, with the opening between the sealing lips facing axially downwardly towards the interior of the insulating jug. While the radially inner sealing lip of the lip seal 22 abuts the bottom of the groove 21, the radially outer sealing lip abuts the peripheral surface 18 of the recess 14, which with the exception of the segments 17 is cylindrical and is chamfered at the upper rim of the recess 14 in the form of an insertion bevel 23 having an angle w of about 30°. The arrangement is such that the lip seal 22 is in contact with the cylindrical section of the peripheral surface 18 in the whole of the region of adjustment between the closed position of the lid and its pouring position, and only comes clear of it on unscrewing the closure lid 7 through and beyond its pouring position. On screwing in the closure lid 7 the sealing lip of the lip seal 22 is inserted without damage through the insertion bevel 23 into the recess 14. The radially outer sealing lip projects slightly from the peripheral surface 12 of the closure lid 7 and contacts the peripheral surface 18 of the recess 14, the diameter D of which corresponds to the external diameter of the female screw, with an elastic prestress. The external diameter d of the peripheral surface 12 of the closure lid 7 is smaller by the distance s required for play. The elastic prestress of the lip seal 22 is produced by the lip seal 22 being slightly radially compressed in the installed position. The sealing of the closure lid 7 in the recess 14 is thus ensured in all positions of the closure lid 7 between the closure position and the pouring position.

When the liquid rises above the lip seal in the greatly inclined pouring position of the insulating jug 1, the liquid flows into the lip seal 22 so that the sealing lips are forced radially outwards or inwards as the case may be and are spread out and progressively tightened according to the liquid pressure.

The thickness e of the lip seal 22 corresponds to the breadth of the groove 21. The lip seal 22 is thus received and enclosed in the groove 21.

The distance f of the sealing lip 24 from the top 19 of the protective casing 2 corresponds at least to the thickness e, the distance b and the length g of the insertion bevel 23.

Figure 2:
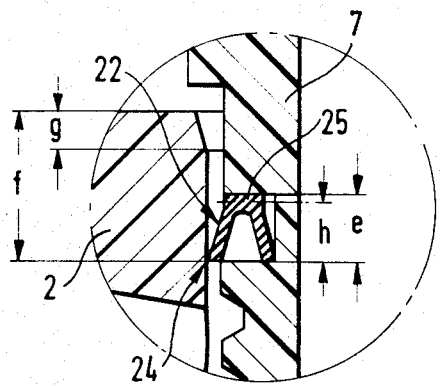
FIG. 2 shows the detail indicated by x on a larger scale.

In the embodiment according to FIGS. 1 and 2 a lip seal is used whose radially outer sealing lip 24, because of the axial extension, projects from the sealing body 25 (relative to the middle of this body) axially downwardly towards the inside of the insulating jug over a substantial length h.

Figure 3:
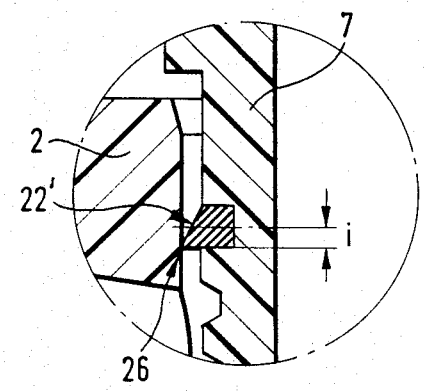
FIGS. 3 and 4 show second and third embodiments of the invention.

Within the scope of the invention however the lip seal 21' shown in FIG. 3 also serves the inventive purpose, the sealing lip 26 of this seal projecting radially outwardly towards the longitudinal centerline of the jug while tapering axially downwardly over a significant smaller length i and terminating in the plane of the sealing lip surface that faces the interior of the jug.

Figure 4:
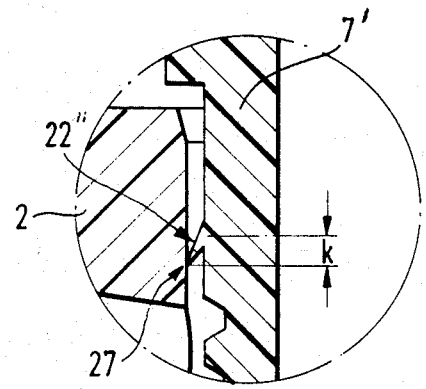

In the third embodiment according to FIG. 4 the sealing lip 27 of the lip seal 22" is formed integrally onto the closure lid 7' that consists of plastic. The extent of the projection in this form is indicated by k. The sealing lip 27 could also be formed on the casing 2 and the sealing lips 24, 26 could be set into the casing 2.

In all the embodiments the sealing is augmented when a liquid pressure is applied internally to the lip seal 22' or 22". The forms in which the sealing lip 24, 27 projects beyond the side of the body that carries them that faces the interior of the jug (FIGS. 2 and 4) can match the sealing lips to a greater radial extent. They are therefore particularly suitable for insulating jugs of plastic because of the relevant tolerances.

What is claimed is:

1. An insulating jug including a casing having a top with a recess formed therein; a filling opening communicating with an insulating insert in said casing being provided in the bottom of the recess; a lid having a closure member insertble into said recess for closing said filling opening; an enclosed pouring spout having an opening adapted to communicate with said filling opening located on said casing projecting radially outwardly from the recess; and a sealing ring located immediately above and adjacent to said spout opening and extending between facing peripheral surfaces of the recess and the lid, said ring comprising a lip seal having a sealing lip projecting downwardly and towards the interior of the jug, and the peripheral surface cooperating with the lip seal being cylindrical in the sealing region of the sealing lip.

2. An insulating jug according to claim 1, characterised in that the lip seal is held axially immovably in a groove.

3. An insulating jug according to claim 2, characterized in that the groove extends about the outer peripheral surface of the lid and the peripheral surface of the recess facing said groove has an insertion bevel for facilitating passage of said lip seal at its upper rim.

4. An insulating jug according to claim 1, characterised in that the lip seal contacts the peripheral surface of the recess.

5. An insulating jug according to claim 1, wherein said lid has a screw thread and the lip seal is located above the screw thread on the peripheral surface of said lid.

6. An insulating jug according to claim 1, characterised in that the lid has a screw thread and the diameter (D) of the recess corresponds to the outer diameter of said screw thread.

7. An insulating jug according to claim 1, characterized in that the sealing lip projects from the side of the lip seal that is directed radially towards the longitudinal centerline of the jug.

8. An insulating jug according to claim 1, characterized in that the lip seal has two sealing lips connected a U-, V- or Y-shaped cross-sectional configuration.

9. An insulating jug according to claim 1, characterised in that the lip seal is formed integrally with the casing or the lid.

* * * * *